United States Patent
Utsunomiya

(10) Patent No.: US 7,379,201 B2
(45) Date of Patent: May 27, 2008

(54) IMAGE PROCESSING APPARATUS AND IMAGE PROCESSING METHOD

(75) Inventor: Takehito Utsunomiya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 306 days.

(21) Appl. No.: 11/199,202

(22) Filed: Aug. 9, 2005

(65) Prior Publication Data

US 2006/0001905 A1    Jan. 5, 2006

Related U.S. Application Data

(62) Division of application No. 09/833,719, filed on Apr. 13, 2001, now Pat. No. 6,985,246.

(30) Foreign Application Priority Data

Apr. 19, 2000  (JP) .............................. 2000-117856
Mar. 29, 2001  (JP) .............................. 2001-096022

(51) Int. Cl.
  *G06F 15/00*   (2006.01)
  *G06K 1/00*    (2006.01)

(52) U.S. Cl. .................. 358/1.15; 358/1.9; 358/1.11; 382/176; 370/257

(58) Field of Classification Search .............. 358/1.15, 358/1.18, 1.9; 382/232, 176
See application file for complete search history.

(56) References Cited

U.S. PATENT DOCUMENTS

| | | | |
|---|---|---|---|
| 5,296,936 A | 3/1994 | Pittas et al. | 358/407 |
| 5,301,350 A | 4/1994 | Rogan et al. | 705/33 |
| 5,561,542 A | 10/1996 | Kosugi et al. | 359/118 |
| 5,602,663 A | 2/1997 | Hamaguchi et al. | 359/125 |
| 5,604,748 A | 2/1997 | Date et al. | 370/449 |
| 5,850,484 A | 12/1998 | Beretta et al. | 382/250 |
| 5,889,596 A | 3/1999 | Yaguchi et al. | 358/448 |
| 5,978,013 A | 11/1999 | Jones et al. | 725/23 |
| 6,009,490 A | 12/1999 | Fukui et al. | 710/113 |
| 6,094,510 A | 7/2000 | Yaguchi et al. | 382/232 |
| 6,100,998 A * | 8/2000 | Nagao et al. | 358/1.9 |

(Continued)

FOREIGN PATENT DOCUMENTS

CN    1190752 A    8/1998

(Continued)

*Primary Examiner*—Douglas Q. Tran
*Assistant Examiner*—Satwant Singh
(74) *Attorney, Agent, or Firm*—Fitzpatrick, Cella, Harper & Scinto

(57) ABSTRACT

An image processing system includes a plurality of image processing sections for performing predetermined image processing on input image data and for outputting the processed image data. A header in which image processing information is described is added to the input image data in order to create packet data, and the created packet data is transferred sequentially to a plurality of image processing sections. A given image processing section inputs the transferred packet data, performs image processing on the image data in accordance with the image processing information described in the header, recreates packet data by adding a header in which the image processing information is rewritten to the image data after processing, and outputs the recreated packet data. Thus, even in a state in which the number of pieces of image data, the amount of the management information thereof, etc., are large, it is possible to easily manage image processing without imposing a large load on a CPU.

13 Claims, 16 Drawing Sheets

U.S. PATENT DOCUMENTS

| | | | |
|---|---|---|---|
| 6,279,149 B1 * | 8/2001 | Field et al. | 717/129 |
| 6,438,635 B1 | 8/2002 | Date et al. | 710/113 |
| 6,480,916 B1 | 11/2002 | Shishizuka et al. | 710/107 |
| 6,499,076 B2 | 12/2002 | Date et al. | 710/113 |
| 6,578,095 B1 | 6/2003 | Tanaka et al. | 710/100 |
| 6,584,103 B1 | 6/2003 | Hanaoka et al. | 370/389 |
| 6,604,151 B1 | 8/2003 | Date et al. | 710/14 |
| 6,608,933 B1 | 8/2003 | Dowell et al. | 382/232 |
| 6,668,158 B1 | 12/2003 | Tsutsui et al. | 455/12.1 |
| 6,697,898 B1 | 2/2004 | Shishizuka et al. | 710/107 |
| 6,707,569 B1 | 3/2004 | Kato et al. | 358/1.15 |
| 6,708,236 B1 | 3/2004 | Date et al. | 710/35 |
| 6,714,312 B1 * | 3/2004 | Hidaka | 358/1.15 |
| 6,741,737 B1 * | 5/2004 | Lenoir | 382/176 |
| 6,775,245 B1 * | 8/2004 | Ishida et al. | 370/257 |
| 6,810,445 B1 | 10/2004 | Sato et al. | 710/33 |
| 6,985,246 B2 * | 1/2006 | Utsunomiya | 358/1.15 |
| 2001/0033392 A1 | 10/2001 | Utsunomiya | 358/1.15 |
| 2002/0007431 A1 | 1/2002 | Date et al. | 710/113 |
| 2002/0059491 A1 | 5/2002 | Date et al. | 710/240 |
| 2002/0105676 A1 | 8/2002 | Fujiwara et al. | 358/1.15 |
| 2003/0151759 A1 | 8/2003 | Suzuki et al. | 358/1.13 |

FOREIGN PATENT DOCUMENTS

| | | |
|---|---|---|
| JP | 4001771 | 1/1992 |
| JP | 11-45225 | 2/1999 |
| JP | 2001-103473 | 4/2001 |

* cited by examiner

NUMBER OF TILES IN ONE PAGE : 220×156 = 34,320

| TOUTCH PANEL OPERATION | SELECTION MODE | IP FUNCTION USED IN IMAGE PROCESSING | IMAGE PROCESSING CONTENTS | IMAGE PROCESSING MODE |
|---|---|---|---|---|
| RESOLUTION | STANDARD | RESOLUTION CONVERSION FUNCTION SECTION 203 | 100×100dpi | mode 0 |
| | FINE | | 100×200dpi | mode 1 |
| | SUPERFINE | | 100×400dpi | mode 2 |
| TYPE OF DOCUMENT | CHARACTER | BINARIZATION FUNCTION SECTION 204 | SIMPLE BINARIZATION | mode 0 |
| | PHOTOGRAPH | | ERROR DIFFUSION METHOD | mode 1 |

FIG. 16

| ID = IP203 | Mode = 1 | ID = IP204 | Mode = 0 | ID = RAM103 | NC | IMAGE DATA |

FIRST HEADER PART — SECOND HEADER PART — THIRD HEADER PART

FIG. 17

IMAGE PROCESSING APPARATUS AND IMAGE PROCESSING METHOD

CROSS REFERENCE TO RELATED APPLICATION

This application is a division of application Ser. No. 09/833,719, filed on Apr. 13, 2001 now U.S. Pat. No. 6,985,246, the entire disclosure of which is incorporated herein by reference.

BACKGROUND OF THE INVENTION

1. Field of the Invention

The present invention relates to an image processing method and apparatus having a plurality of image processing sections for performing predetermined image processing on input image data and for outputting the image data.

2. Description of Related Art

Digital multifunction machines (multifunction peripherals, hereinafter referred to as "MFPs") combining the functions of a copier, a fax, a printer, etc., are widely used. In the MFPs, input/output operations by a scanner section, a printer section, etc., the operation of a function for connecting to a network and a communication line, and the function of image processing of image data, as well as operations in which those are combined, are controlled by a control section (CPU) for controlling the entire system.

An MFP typically comprises an image processing section having several image processing (IP) functions for performing various image processing, such as, for example, resolution conversion, binarization, rotation processing, and color conversion, on input image data. For example, in a copier disclosed in Laid-Open Japanese Patent No. 4-1771, an image processing section is disclosed in which each of these functions is realized as an image processing circuit, and each circuit is connected in series so as to perform pipeline processing on the image data. The system controller (CPU) of this copier is capable of performing settings for image processing in each image processing circuit and performing data transfer instructions thereto via a bus line, and thus is capable of performing desired image processing for each area of an image.

Meanwhile, in recent years, MFSPs have appeared in which concurrent multifunction operation is made possible such that, in addition to simply combining a plurality of device functions so as to operate in sequence, for example, while a fax operation is being performed, a copying operation can be performed. By using, as an example, a case where a copying operation is performed while a fax transmission operation is being performed, a conventional concurrent multifunction operation is described. Here, it is assumed that an image processing section of the MFP is constructed so as to perform pipeline processing by a plurality of image processing circuits, as described in the conventional art. It is also assumed that image data for the fax operation and image data for the copying operation, input by a scanner section, are temporarily stored in a memory in page units.

First, the MFP starts image processing on image data for fax transmission. The CPU performs image processing settings for fax transmission in each image processing circuit within the image processing section via a bus line, etc. Examples of settings include image processing information (resolution, binarization processing method, angle of rotation, paper size, etc.) in each image processing circuit (circuit having resolution conversion function, binarization function, rotation function, etc.). After setting these pieces of image processing information, image data for fax transmission is transferred from the memory to the image processing section, and image processing is performed in sequence for each area in the image data. Then, when image processing for one page of the image data for fax transmission is completed, image processing is started on the image data for the copying operation. The CPU sets image processing information in the image processing section in order to perform image processing. After the setting, the image data is transferred to the image processing section, and in a similar manner, image processing for one page is performed.

In this manner, conventionally, device function operations of the scanner section, the printer section, and the fax function section are concurrently performed in parallel. However, the image processing performed by the image processing section is only processing for each device function operation, which is switched in page units and is performed. That is, a concurrent multifunction operation is not performed in the image processing section, and as is conventionally done, the memory is allocated in page units and the image data is processed in page units. Therefore, it cannot be said that the memory is used effectively, and it cannot be said that efficiency is satisfactory from the viewpoint of performing image processing.

Accordingly, an image processing apparatus has been conceived in which image data in page units is divided in advance into areas having a predetermined size before image processing is performed, and processing is performed in units of the divided area image data. For example, since an image processing section having a construction for performing the above-described pipeline processing can perform image processing for each desired area, image processing in units of the divided area image data can be easily performed. As a result of forming the image processing section in this manner, it is possible to use the memory in units of the area image data.

In addition, since image data for a plurality of device function operations is input in units of the area image data, image processing can be performed in parallel. For example, inside the image processing section, parallel processing can be performed such that while resolution conversion is being performed on the image data related to the fax communication operation, a rotation operation is performed on the image data related to the copying operation.

However, since image data in page units is divided into a plurality of area image data, the number of pieces of image data to be processed becomes enormous. Furthermore, image data for the object of a different image processing operation coexists inside the image processing section. Therefore, in a case where setting for status recognition and image processing of the image processing section, and image data transfer control, using a bus line, etc., which is conventionally performed, are performed, the amount of management information to be processed becomes enormous. As a result, a problem arises in that it is difficult for the CPU which controls the entire system to manage the image processing section.

Furthermore, in a case in which the number of pages to be processed at a time is increased without being limited to performing a concurrent multifunction operation, the number of pieces of area image data, the amount of management information, etc., become enormous. In a similar manner, a problem arises in that it is difficult for the CPU which controls the entire system to manage the image processing section.

SUMMARY OF THE INVENTION

The present invention has been made to solve the above-described problems. An object of the present invention is to provide an image processing apparatus and an image processing method, which are capable of easily managing image processing without imposing a large load on the CPU even in a state in which the number of pieces of image data, the amount of the management information thereof, etc., are large.

To achieve the above-mentioned object, according to a first aspect, the present invention provides an image processing apparatus having a plurality of image processing means for performing image processing on input image data and for outputting the image data, the image processing apparatus comprising: creation means for creating packet data by adding a header in which image processing information is described for the image data; and transfer means for transferring the packet data between the creation means and each image processing means, wherein the plurality of image processing means input the packet data from the transfer means, perform image processing on the image data on the basis of the image processing information described in the header, create packet data by adding a header in which the image processing information is rewritten for the image data after processing, and output the packet data to the transfer means.

Another object of the present invention is to provide an image processing apparatus and an image processing method, which are capable of performing image processing for a plurality of device function operations in a parallel manner without imposing a large load on the CPU even in a state in which a plurality of device function operations are being performed.

To achieve the above-mentioned object, according to a second aspect, the present invention provides an image processing apparatus which has a plurality of image processing means for performing predetermined image processing on input image data and for outputting the image data and which is capable of performing a plurality of device function operations in parallel using a connected external device, the image processing apparatus comprising: first creation means for adding a header in which image processing information corresponding to a first device function operation is described for image data used in the first device function operation in order to create first packet data; second creation means for adding a header in which image processing information corresponding to a second device function operation is described for image data used in the second device function operation in order to create second packet data; and transfer means for transferring the packet data among the first creation means, the second creation means, and each image processing means, wherein the plurality of image processing means comprise first image processing means which inputs the first packet data from the transfer means, which performs image processing on image data on the basis of the image processing information described in the header, which creates packet data by adding a header in which the image processing information is rewritten for the image data after processing, and which outputs the packet data to the transfer means, and second image processing means, while processing related to the first packet data is being performed in the first image processing means, which inputs the second packet data from the transfer means, which performs image processing on image data on the basis of the image processing information described in the header, which creates packet data by adding a header in which the image processing information is rewritten to the image data after processing, and which outputs the packet data to the transfer means.

Yet another object of the present invention is to provide an image processing apparatus and an image processing method, which are capable of making the input/output interface portions common with other image processing apparatuses in a case in which packet data is used for image processing since a requested process can be specified only by analyzing the information at the beginning of the input data.

To achieve the above-mentioned object, according to a third aspect, the present invention provides an image processing apparatus which is connected to a predetermined data bus and which is capable of transferring packet data to and from an external device via the data bus, the packet data being such that a header in which image processing information is described is added to image data, the image processing apparatus comprising: input means for inputting packet data in such a manner that the data is divided into a header and image data, to which packet data is added to the header in which identification information of a device and processing content information corresponding to the identification information are described in sequence from the beginning of the header in accordance with the sequence of a device which performs processing; header analysis means for analyzing processing content information described at the beginning of the header input by the input means; image processing means for performing image processing on image data input by the input means on the basis of the analysis result by the header analysis means; header creation means for creating a new header such that the identification information of an external device which next performs image processing and processing content information corresponding to the identification information are located at the beginning of the header; and output means for newly creating packet data from the image data processed by the image processing means and from the header created by the header creation means and for outputting the packet data.

The above and further objects, aspects and novel features of the invention will become more fully apparent from the following detailed description when read in conjunction with the accompanying drawings.

BRIEF DESCRIPTION OF THE DRAWINGS

FIG. 16 is a second illustration of packet data when processing is performed in accordance with the flowchart shown in FIG. 13; and FIG. 17 is a third illustration of packet data when processing is performed in accordance with the flowchart shown in FIG. 13.

DETAILED DESCRIPTION OF THE PREFERRED EMBODIMENTS

The embodiments of the present invention will now be described below with reference to the attached drawings.

Figure 1:
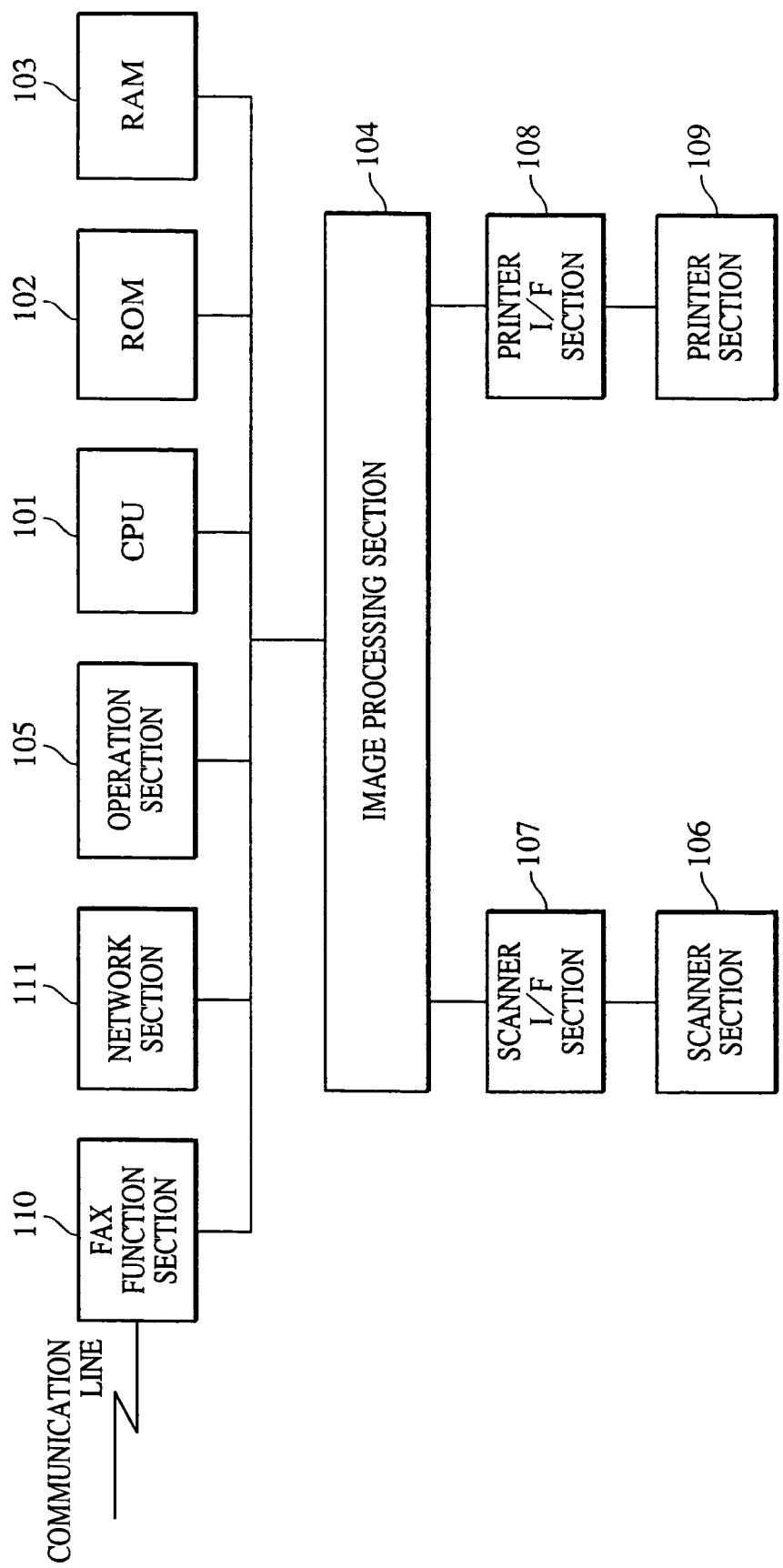
FIG. 1 is a block diagram illustrating an MFP (Multifunction Peripheral) to which an image processing apparatus of the present invention can be applied.

A block diagram of an MFP (Multifunction Peripheral) to which an image processing apparatus of the present invention can be applied is shown in FIG. 1. It is assumed that the MFP described in this embodiment combines the functions of a fax, a printer, and a copier, and processes color image data.

Referring to the block diagram shown in FIG. 1, the entire construction of the MFP in this embodiment will be described first. A CPU 101 controls the entirety of the functions of the MFP, including an image input/output device, such as a scanner section and a printer section, an image processing section, a communication function section, etc. Furthermore, the CPU 101 performs a process of creating packet data (to be described later). A ROM 102 has stored therein operation programs of the MFP, etc. A RAM 103 is used as a work area for the MFP to operate, and tiled image data (to be described later) is stored therein. An image processing section 104 comprises a plurality of IP (Image Processing) function sections for performing various image processing, such as color space conversion, resolution conversion, binarization, and rotation, on packet data. An operation section 105 displays the status and setting information of the MFP to a user and transfers an operation command from the user to the CPU 101.

A scanner section 106 is an image reading device for reading an image and generating image data. The scanner section 106 comprises a lens for collecting light reflected from a document, a CCD (Charge Coupled Device) sensor for inputting light and converting it into electrical signals, an analog signal processing section, and an analog-to-digital conversion circuit (not shown). The scanner section 106 outputs the generated image data to a scanner I/F (interface) section 107. The scanner I/F section 107 performs various scanner image processing, such as space filtering processing and input color space conversion, on the image data input from the scanner section 106. Furthermore, the scanner I/F section 107 divides image data obtained in page units into a plurality of pieces of tiled image data and outputs it to the image processing section 104.

A printer I/F section 108 performs printer image processing, such as image area (object) processing, and smoothing, on the image data output from the image processing section 104. It is also possible for the printer I/F section 108 to combine a plurality of pieces of tiled image data with page image data and to output it to a printer section 109. The printer section 109 forms an image on a printing medium on the basis of the image data output from the printer I/F section 108. The printer section 109 is, for example, a printer device, such as a laser beam printer or an LED (Light-Emitting Diode) printer. In the case of a laser beam printer, the printer section 109 is formed of an exposure control section having a semiconductor laser, an image forming section, a transfer control section (not shown) for transfer paper, etc. Instructions of operation to the scanner section 106, the scanner I/F section 107, the printer I/F section 108, and the printer section 109 are performed by the CPU 101 via the image processing section 104.

A fax function section 110 transmits or receives image data via a communication line on the basis of the information set in the operation section 105, and performs a predetermined facsimile process. A network section 111 connects various devices, such as a PC (Personal Computer) and other MFPs, on a network via a LAN (Local Area Network), etc.

Figure 2:
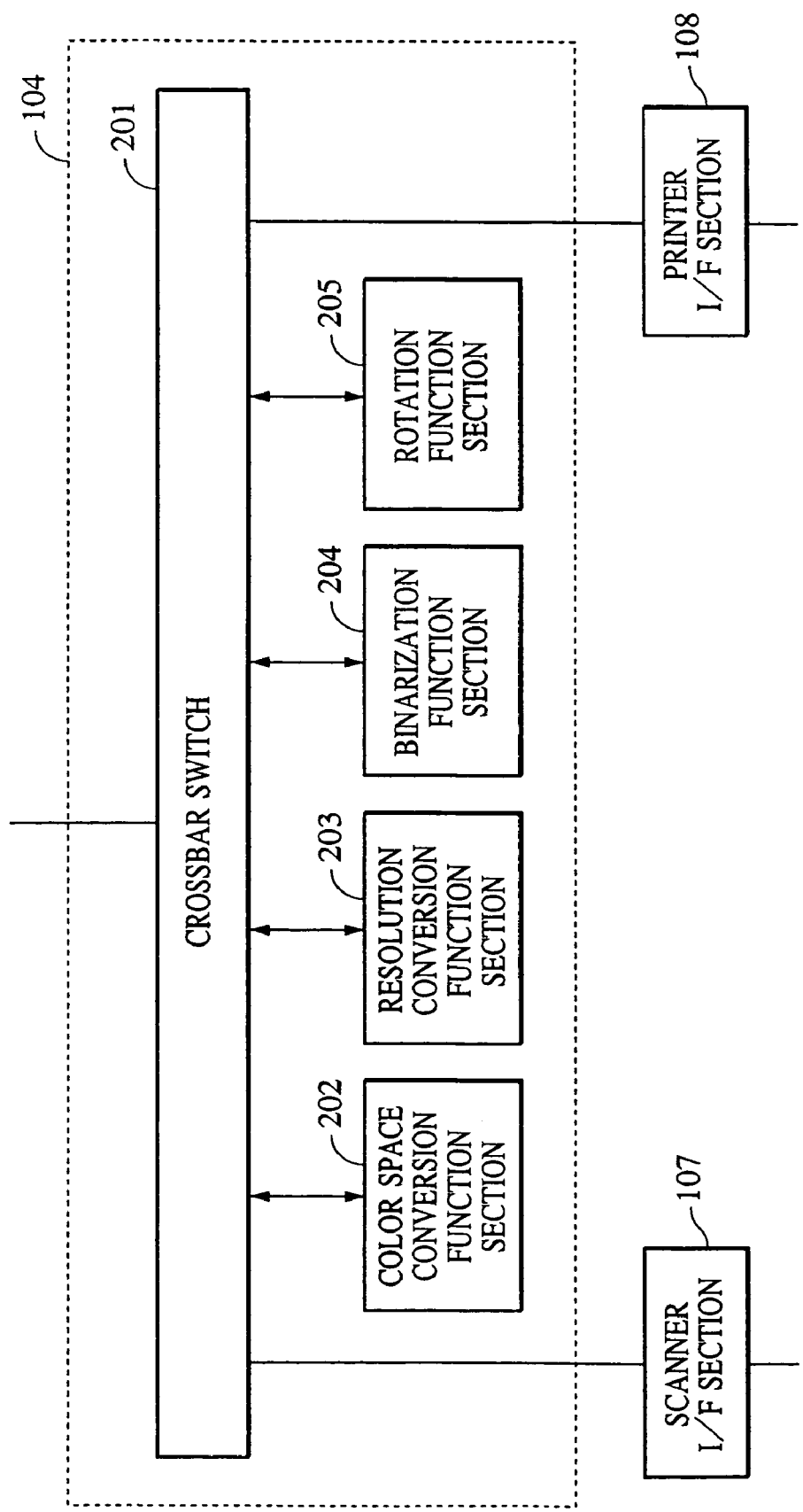
FIG. 2 is a block diagram illustrating the details of an image processing section 104 shown in FIG. 1.

Next, the details of the image processing section 104 are described with reference to the block diagram shown in FIG. 2. A crossbar switch 201 interconnects each IP function section inside the image processing section 104, the scanner I/F section 107, and the printer I/F section 108 so that free transfer of image data is realized. IP (image processing) function sections 202 to 205 perform respectively different image processing on the image data. It is assumed that the image processing section in this embodiment has four IP function sections described below.

A color-space conversion function section 202 perform, on the input image data, color conversion such that an RGB color space is converted into a CMYK color space which is a second color space. A resolution conversion function section 203 performs resolution conversion on the input image data. In this embodiment, it is assumed that the resolution of the image data read by the scanner section 106 is 600×600 dpi. This image data is converted into that at a resolution of, for example, 100×200 dpi according to the purpose. A binarization function section 204 performs binarization on the input image data by an appropriate method selected from a simple binarization, an error diffusion method, etc., according to the type of image data, such as a character or a photograph. A rotation function section 205 performs rotation of, for example, 90°, 180°, or 270°, on the input image data. Although this embodiment was described by these four IP function sections, the image processing section may comprise other IP function sections.

Figure 3:
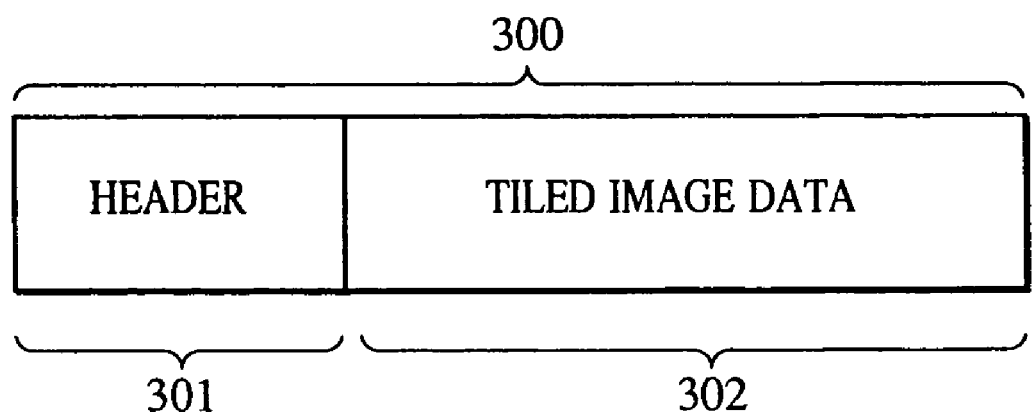
FIG. 3 illustrates the format of packet data in this embodiment.

Next, a description is given of packet data used in this embodiment, and a method for creating the packet data. FIG. 3 shows the format of the packet data in this embodiment. Packet data 300 is composed of a header 301 and tiled image data 302. Here, the "tiled image data" is image data formed of a rectangular area having a predetermined number of pixels in the horizontal and vertical directions. The tiled image data 302 is prestored in the RAM 103. In the header 301, image processing information, such as the processing sequence of the IP function sections in a case where image processing for the tiled image data 302 is performed, and processing contents in the respective IP function sections, are described.

Figure 4:
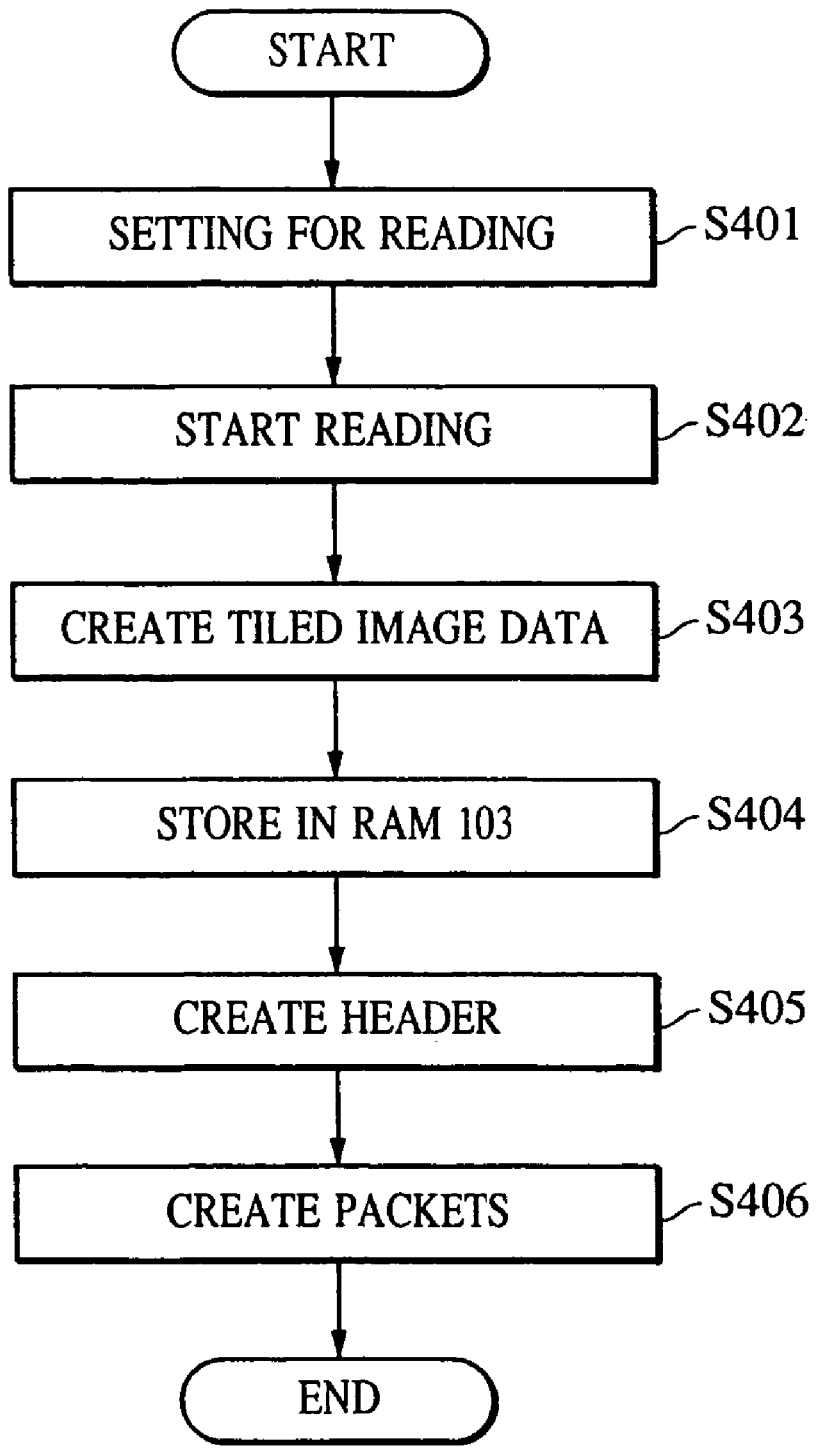
FIG. 4 is a flowchart illustrating the procedure of creating packet data 300 shown in FIG. 3.

Next, the procedure of creating the packet data 300 is briefly described with reference to the flowchart shown in FIG. 4 by taking, as an example, a case in which image data in page units read by the scanner section 106 is stored in the RAM 103.

Initially, in the operation section 105, a user performs a setting for an image reading process (S401). After the setting, the user issues a reading start command, the CPU 101 receiving this command causes the scanner section 106 to start reading a document (S402). The image data in page units created by the scanner section 106 is input to the scanner I/F section 107, and the scanner I/F section 107 divides the page image data in tile units in accordance with the instructions of the CPU 101 in order to create the tiled image data (S403).

Figure 5:
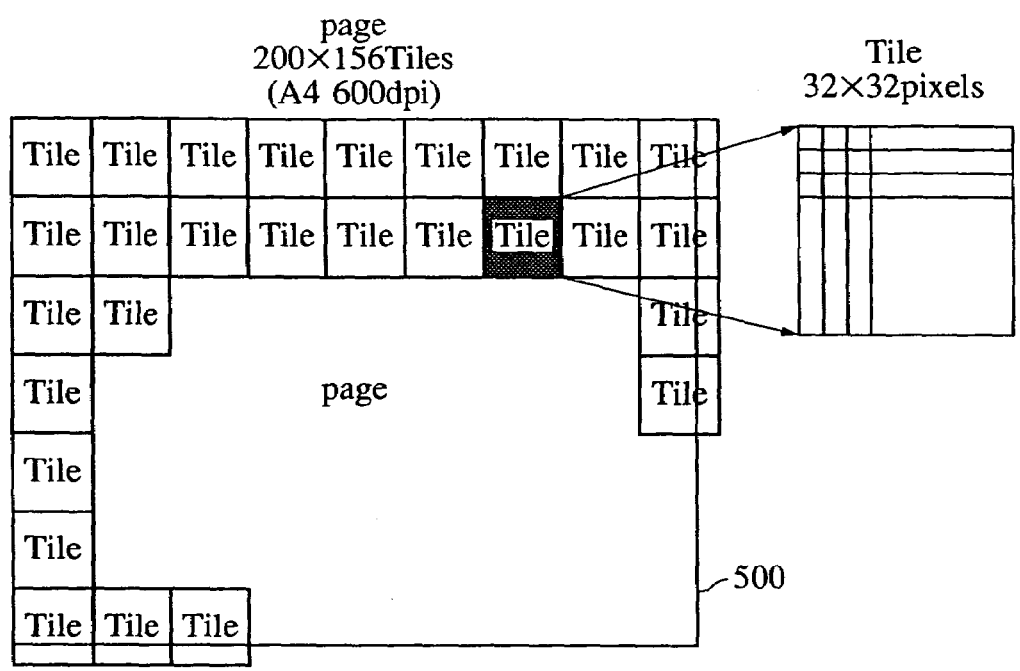
FIG. 5 is a diagram illustrating a situation in which tiled image data is created for each area from a one-page document 500.

Here, a creation process of step S403 is described in detail. As shown in FIG. 5, a one-page document 500, input as raster image data from the scanner section 106, is divided into a plurality of rectangular areas (tiles). Each rectangular area has a size of 32 pixels vertically and 32 pixels horizontally, and tiled image data is created for each area. Here, if it is assumed that a document of A4 size is read at a resolution of 600×600 dpi by the scanner section 106 and is divided by a tile of 32×32 pixels, 34,320 pieces of tiled image data is created from the document of A4 size. Furthermore, in the creation of tiled images, the CPU 101 performs a setting for the scanner I/F section 107 according to the reading resolution and the convenience of image processing, making it possible to cause the tiled image to have a shape and a number of pixels for which handling is easy.

The created tiled image data is input to the image processing section 104 and is transferred to the RAM 103 via the crossbar switch 201. Then, each piece of the tiled image data, together with identification information, etc., is temporarily stored in a predetermined location in the RAM 103 (S404). At this time, a management table of the tiled image data may be created within the RAM 103, and the address at which the management table is stored, identification information, etc., may be collectively managed. The CPU 101 creates a header in accordance with a command related to image processing, set by the operation section 105, or in accordance with information set by a device connected via the network section 111 (S405). The CPU 101 reads the tiled image data corresponding to each header from the RAM 103. Then, the CPU 101 adds the header to the read tiled image data in order to create packet data to be sent to the image processing section 104, and the processing is terminated (S406).

Although in the foregoing, the creation of the packet data in a case where image data is input by the scanner section 106 was described, the image data input destination is not limited thereto, and the image data may be input from the network section 111, the fax function section 110, etc. In the MFP of this embodiment, the network section 111 and the fax function section 110 can input image data transferred from an external device, etc., and can store the input image data in the RAM 103. In a case where this image data is to be stored as tiled image data in the RAM 103, the CPU 101 may perform a dividing process on the input image data, or the network section 111 and the fax function section 110 may perform a dividing process when image data is input and transfer the created tiled image data to the RAM 103.

Furthermore, the MFP of this embodiment may comprise a storage device (not shown), such as a hard disk drive (HDD), and a disk controller (not shown) for controlling access to the HDD and transfer of image data through a connection between the HDD and the system bus of the MFP. Also in this case, similarly, the CPU 01 may perform a dividing process on the image data transferred from the disk controller, or the disk controller may perform a dividing process on the image data and transfer the created tiled image data to the RAM 103. In a case where image data is input from an external device, a HDD, etc., in this manner, and the tiled image data is stored once in the RAM 103, for the packet data creating process, processing of step S405 and subsequent steps is performed.

Figure 6:
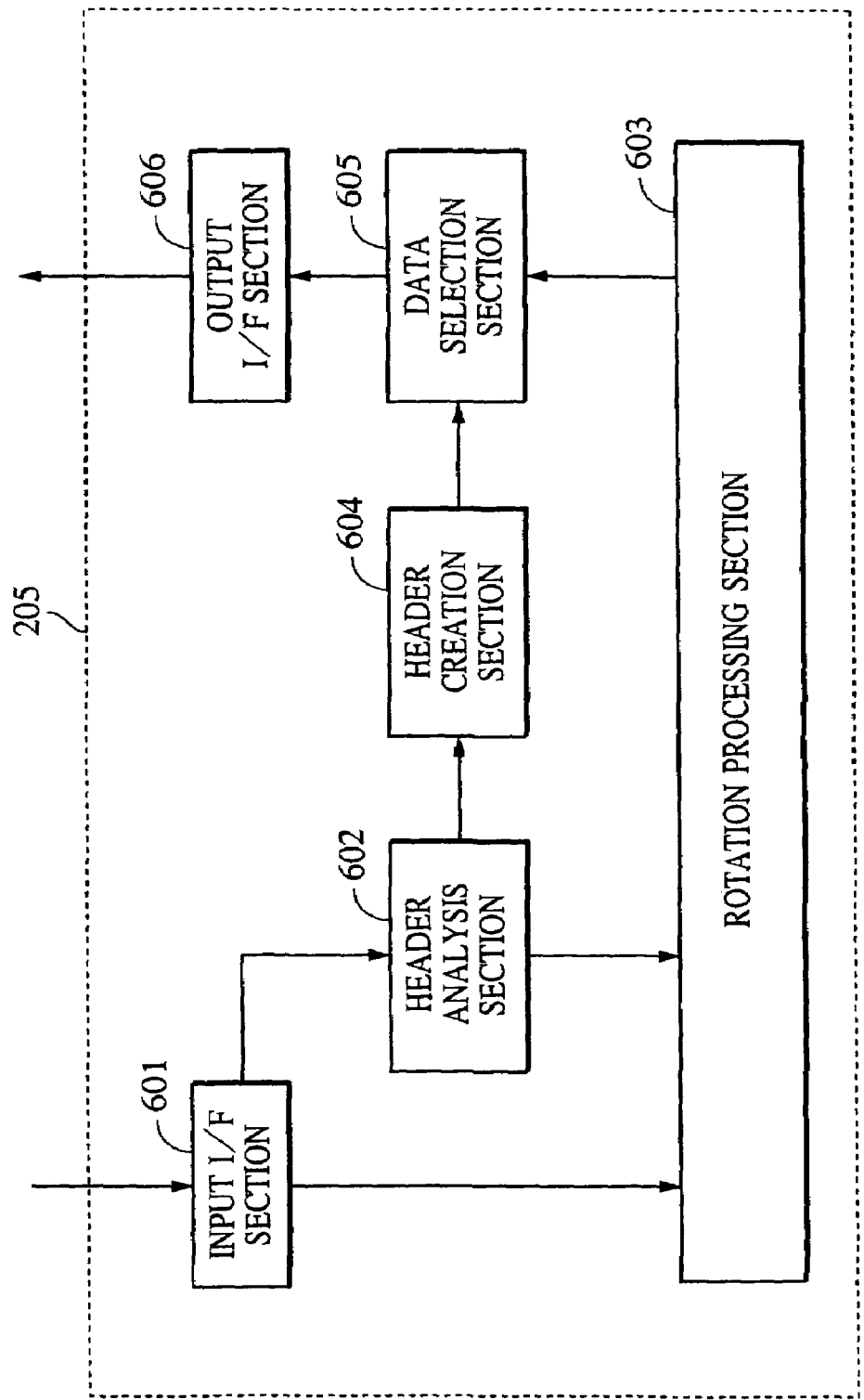
FIG. 6 is a block diagram illustrating the internal construction of the rotation function section 205 of FIG. 2.

Next, the internal construction of the IP function sections 202 to 205 is described. The IP function sections in this embodiment have the same internal construction. Here, as an example, the internal construction of the rotation function section 205 is described with reference to the block diagram shown in FIG. 6.

An input I/F (interface) section 601 is connected to the crossbar switch 201, so that the input packet data is divided into a header and tiled image data. The header is then sent to a header analysis section 602, and the tiled image data is sent to a rotation processing section 603. The header analysis section 602 extracts image processing information from the header input from the input I/F section 601 and analyzes the information. The header analysis section 602 determines the information at the beginning of the image processing information to be processing content of the rotation processing section 603, and sets the image processing content in the rotation processing section 603. As will be described later, that described as the image processing content in the header is a mode number for identifying which operation mode of the operation modes in which the rotation processing section 603 can perform processing operations should be performed. In the rotation processing section 603, the mode number corresponds to the angle of rotation. Then, the header analysis section 602 transfers the header part after analysis to a header creation section 604.

The rotation processing section 603 is an IP function section for performing image processing on the image data received from the input I/F section 601 in accordance with the image processing content set by the header analysis section 602. The rotation processing section 603 performs rotation conversion of 0°, 90°, 180°, or 270° on the image data on the basis of, for example, the set processing content (mode), and sends the image data after conversion to a data selection section 605.

The header creation section 604 recreates the header of the packet data which is input to the next image processing section from the header input from the header analysis section 602. The header creation section 604 sends the created header to the data selection section 605. The data selection section 605 selectively outputs the header from the data selection section 605 and the image data output from the rotation processing section 603. The image data output from the data selection section 605 is in the form of packet data. An output I/F section 606, which is connected to the crossbar switch 201, outputs the packet data to the crossbar switch 201.

For the internal construction of the color-space conversion function section 202, the resolution conversion function section 203, and the binarization function section 204, the same description can be made by only replacing the rotation processing section 603, which is an IP function section, with a color-space conversion function section, a resolution conversion function section, and a binarization function section.

Figure 7:
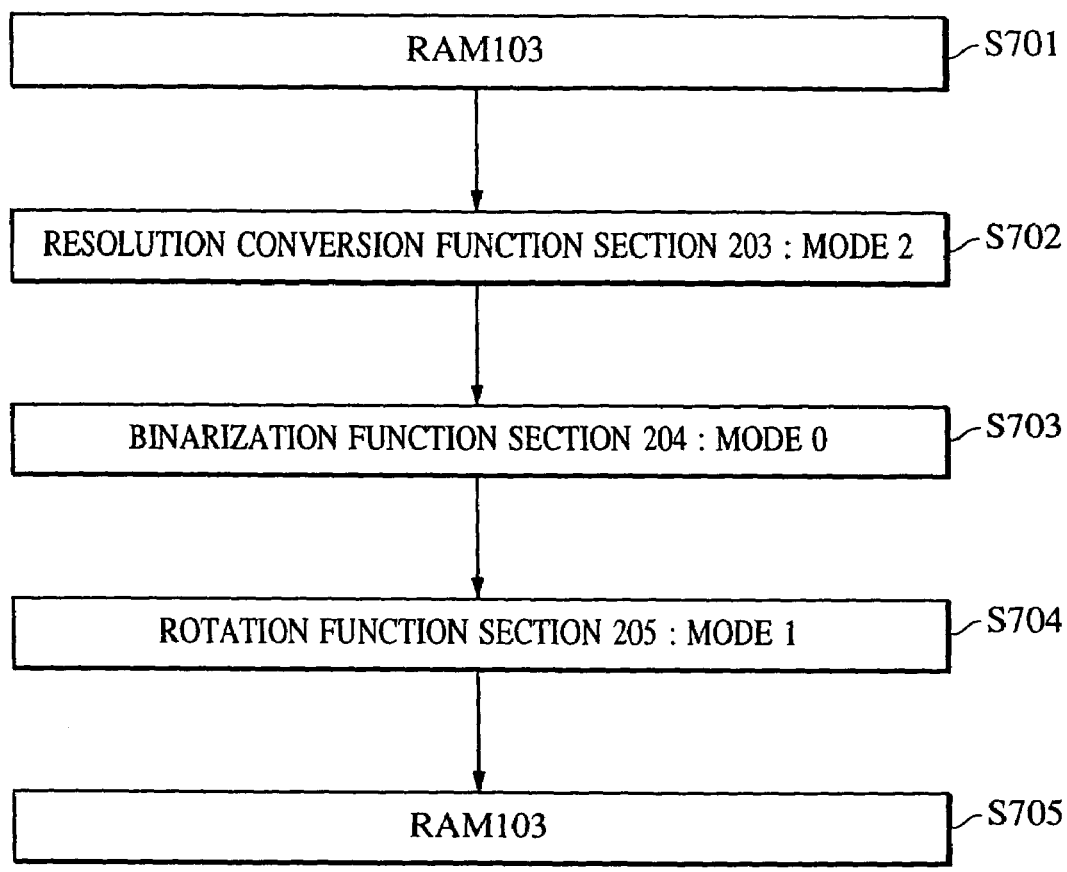
FIG. 7 is a flowchart illustrating the operation of the image processing section 104 of FIG. 1.

Next, a description is given of the operation of the image processing section 104 in a case where image processing is performed on image data, for example, in the sequence shown in the flowchart in FIG. 7 and by the processing content (mode) in this embodiment. Furthermore, the status change of the header of the packet data, caused by this operation, is described with reference to FIGS. 8, 10, 11, and 12.

As shown in FIG. 7, it is assumed that an operation is performed for processing the image data prestored in the RAM 103 (S701) in the sequence of mode 2 (S702) of the resolution conversion function section 203→mode 0 (S703) of the binarization function section 204→mode 1 (S704) of the rotation function section 205 and for rewriting into the RAM 103 (S705).

Figure 8:
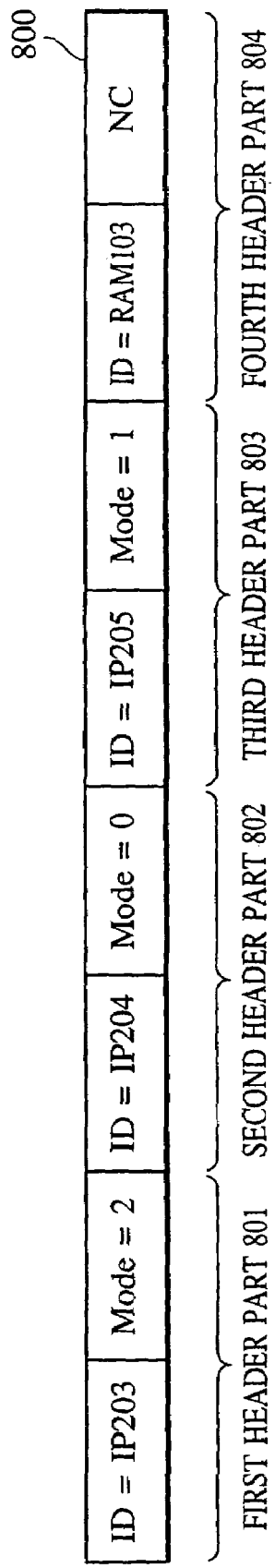
FIG. 8 is a first illustration of a status change of a header of packet data when processing is performed in accordance with the flowchart shown in FIG. 7.

First, before entering the operation in each IP function section, the CPU 101 creates packet data from the tiled image data prestored in the RAM 103. The details of a header 800 of the created packet data stored in the RAM 103 are shown in FIG. 8. In the header 800, for the image processing operation shown in FIG. 7, a set of an ID indicating which IP function section should be used and the mode of the image processing indicating what kind of image processing operation should be performed by that IP function section is described in sequence from the beginning of the header. Although in this embodiment, only the ID and the mode are shown, other information, such as data length, may be added to the header as necessary.

Therefore, when the operation shown in FIG. 7 is to be performed, in a first header part 801, the ID (IP 203) of the resolution conversion function section 203, which is an IP function section, which first performs processing, and the mode (mode 2) of image processing performed by the resolution conversion function section 203 are described. In a second header part 802, the ID (IP 204) of the binarization function section 204 which next performs processing, and the mode (mode 0) of image processing are described. In a third header part 803, the ID (IP 205) of the rotation function section 205, and the mode (mode 1) are described. In a fourth header part 804, the ID (RAM 103) indicating the RAM 103 so that the data is rewritten into the RAM 103, and information (NC) indicating "no information" are described.

The CPU 101 transfers the packet data, in which image processing information such as the sequence of image processing and image processing content indicated by the operation mode are described in the header in this manner, to the resolution conversion function section 203, which is an IP function section which first performs image processing, via the crossbar switch 201.

Figure 9:
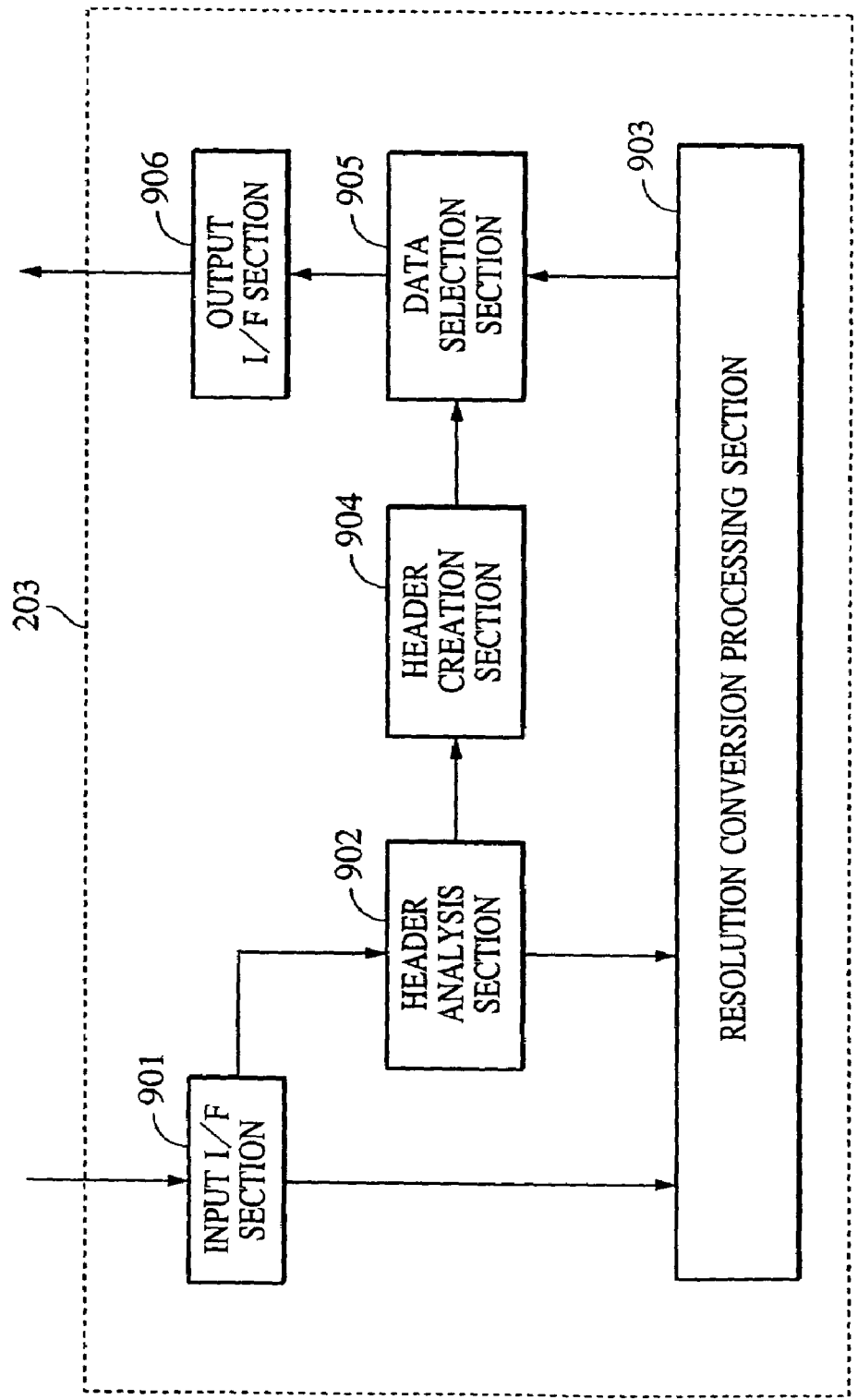
FIG. 9 is a block diagram illustrating the internal construction of the resolution conversion function section 203 of FIG. 2.

The internal construction of the resolution conversion function section 203 is shown in the block diagram of FIG. 9. As is clear from the comparison with the rotation function section 205 of FIG. 6, a different component for each IP function section is only a resolution conversion processing section 903 which performs image processing in practice.

In the resolution conversion function section 203 receiving the packet data, an input I/F section 901 divides the packet data into a header and tiled image data, and transfers the header to a header analysis section 902 and transfers the tiled image data to the resolution conversion processing section 903. The header analysis section 902 analyzes the header in order to read the operation mode (mode 2) described in the first header part 801, and sets the operation mode to be performed by the resolution conversion processing section 903 to "2".

The resolution conversion processing section 903 performs image processing of operation mode 2 on the tiled image data received from the input I/F section 901. For example, if the resolution of the input tiled image data is 600×600 dpi, and if the operation mode number "2" indicates resolution conversion into 100×400 dpi, conversion for reducing an image is performed.

Figure 10:
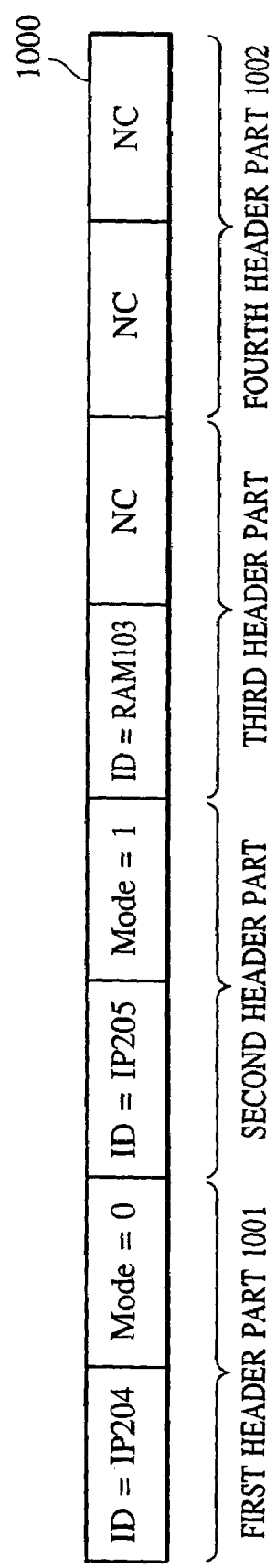
FIG. 10 is a second illustration of a status change of a header of packet data when processing is performed in accordance with the flowchart shown in FIG. 7.

A header creation section 904 deletes its own ID and the operation mode from the received header information, and shifts the data within the header information to the left so that the second header part 802 in which the information of the IP function section to be processed next is described is located at the beginning of the header. The newly created header is shown in FIG. 10. The information for the binarization function section at the next IP function section is a first header part 1001, and "no information" (NC) is added to a fourth header part 1002. Then, a data selection section 905 selectively outputs the newly recreated header and the image data after image processing, thereby creating packet data, and the created packet data is sent to an output I/F section 906, and the packet data is sent to the binarization function section 204.

The internal construction of the header creation section 904 will now be described in detail below with reference to the block diagram shown in FIG. 11.

Figure 11:
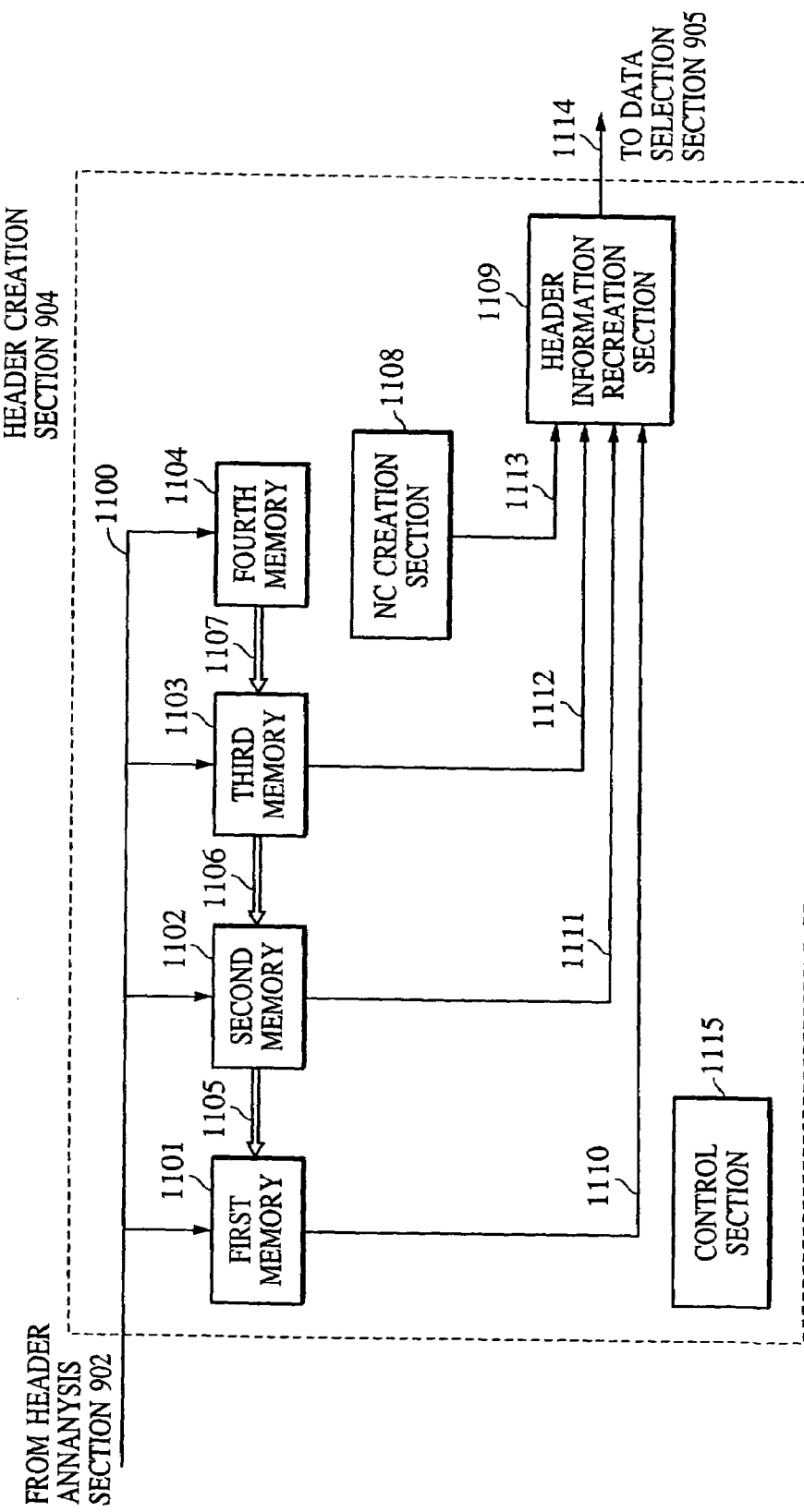
FIG. 11 is a third illustration of a status change of a header of packet data when processing is performed in accordance with the flowchart shown in FIG. 7.

Referring to FIG. 11, reference numeral 1100 denotes a bus for inputting header information from the header analysis section 902 to the header creation section 904. Reference numeral 1101 denotes a first memory for storing the data of a first header part within the input header information. Similarly, reference numeral 1102 denotes a second memory for storing the data of a second header part. Reference numeral 1103 denotes a third memory for storing the data of a third header part. Reference numeral 1104 denotes a fourth memory for storing the data of a fourth header part.

Reference numeral 1105 denotes a bus for transferring the data stored in the second memory 1102 to the first memory 1101. Similarly, reference numeral 1106 denotes a bus for transferring the data stored in the third memory 1103 to the second memory 1102. Reference numeral 1107 denotes a bus for transferring the data stored in the fourth memory 1104 to the third memory 1103.

Reference numeral 1108 denotes an NC creation section for creating "no information" (NC). Reference numeral 1109 denotes a header information recreation section for recreating header information from the data stored in the first memory 1101, the second memory 1102, and the third memory 1103 and from the data created by the NC creation section 1108.

Reference numerals 1110, 1111, 1112, and 1113 denote buses for transferring the data of the first memory 1101, the second memory 1102, the third memory 1103, and the NC creation section 1108 to the header information recreation section 1109, respectively. Reference numeral 1114 denotes a bus for outputting the header information from the header information recreation section 1109 to a data selection section 905.

Reference numeral 1115 denotes a control section for controlling the entire header creation section 904. The control section 1115 controls the first to fourth memories, the NC creation section 1108, the header information recreation section 1109, and the buses by using a signal line (not shown).

Figure 12:
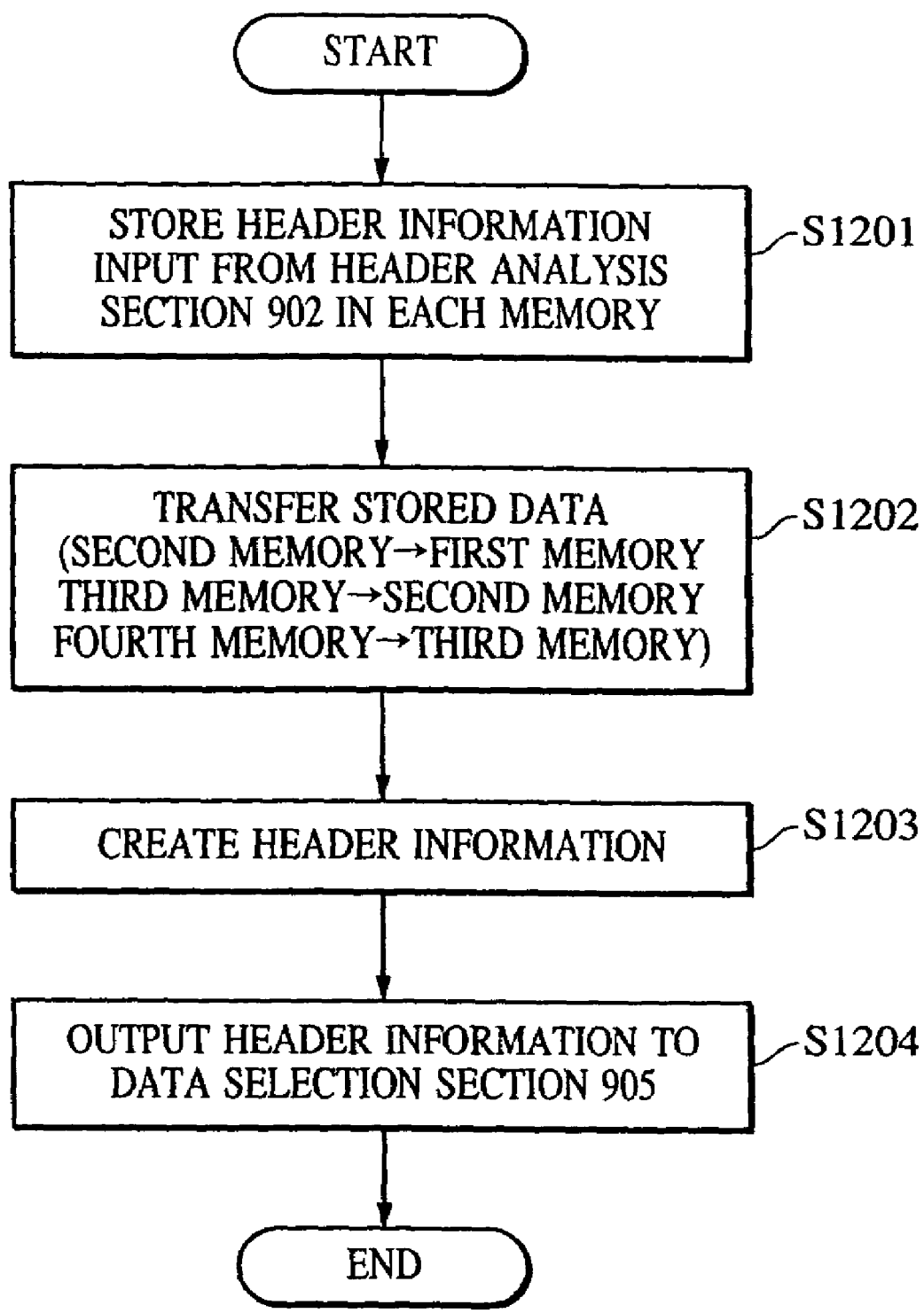
FIG. 12 is a fourth illustration of a status change of a header of packet data when processing is performed in accordance with the flowchart shown in FIG. 7.

Next, a description is given of the header creation process by the header creation section 904 with reference to the flowchart shown in FIG. 12. The creation process shown in the flowchart of FIG. 12 is controlled by the control section 1115.

Initially, header information which is input from the header analysis section 902 via the bus 1100 in each memory. Here, if it is assumed that the header information 800 shown in FIG. 8 is input, the first header part 801 is stored in the first memory 1101, the second header part 802 is stored in the second memory 1102, the third header part 803 is stored in the third memory 1103, and the fourth header part 804 is stored in the fourth memory 1104 (step S1201).

Next, the data of each header part, stored in each memory, is transferred to the memory in which the previous header part is stored, and is stored therein. That is, the second header part 802 of the second memory 1102 is stored in the first memory 1101, the third header part 803 of the third memory 1103 is stored in the second memory 1102, and the fourth header part 804 of the fourth memory 1104 is stored in the third memory 1103 (step S1202).

Then, the header information recreation section 1109 recreates the header information based on the data transferred from the first to third memories and the NC data created by the NC creation section. The header part is formed in order from the start of the header: the data transferred from the first memory 1101, the data transferred from the second memory 1102, and the data transferred from the third memory 1103. Then, NC data is appended to the end. As a result, header information 1000 shown in FIG. 10 is created (step S1203).

As a result of transferring the header information 1000 created by the header information recreation section 1109 time data selection section 905, a series of header creation processes is terminated (step S11204).

In step S1202, the data of each memory is transferred to the memory in which the previous header part is stored. At this time, the first header part 801 stored in the first memory 1101 has not been transferred anywhere. That is, as a result of the second header part being stored in the first memory 1101, the first header part 801 is deleted from the header information.

In step S1203, the header information recreation section 1109 creates the header information in order from the start of the header: the first memory 1101, the second memory 1102, the third memory 1103, and the NC creation section 1110. Also, as described above, the data of each header part is transferred among the memories in step S1202. Therefore, in the header information recreation section 1109, the header information is recreated in the form of the header information 1000 in which each header part is shifted toward the start in comparison with the header information 800.

The construction of this header creation section is not possessed only by the resolution conversion function section 203, and the IP function sections 202 to 205 have in common.

Figure 13:
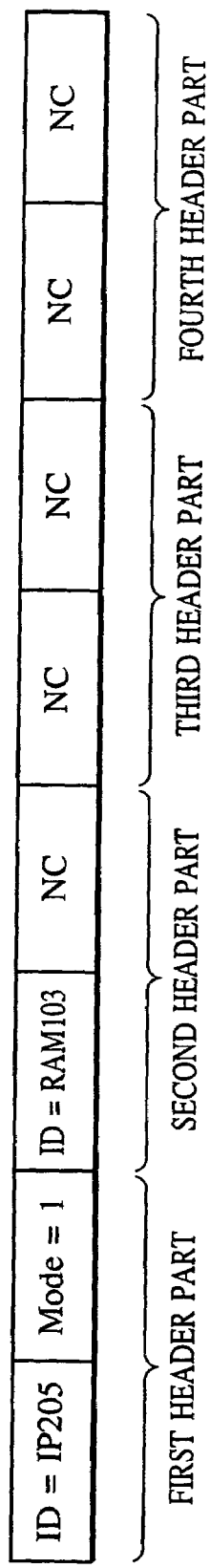
FIG. 13 is a flowchart illustrating the operation when tiled image data is transmitted by fax.
Figure 14:
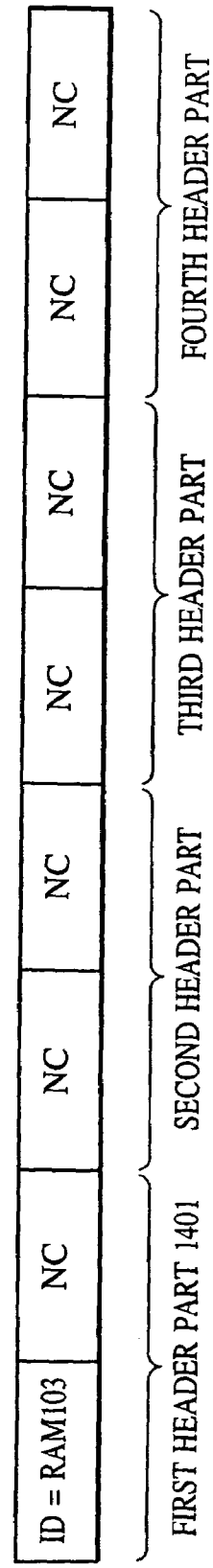
FIG. 14 is an illustration of settings of a fax function.

After the packet data is output from the resolution conversion function section 203, the above-described operations are repeated by each IP function section. The binarization function section 204 performs image processing in operation mode 0, and the header of the output data becomes as shown in FIG. 13. Furthermore, the rotation function section 205 performs image processing in operation mode 1, and the header information part becomes as shown in FIG. 14. Then, in the packet data output finally from the rotation function section 205, since the ID of a first header part 1201 is the RAM 103, the data is rewritten into the RAM 103, and the series of operations is terminated.

In this embodiment, the header of the packet data is subjected to image processing in the IP function section, after which the first header part is deleted, and the header part shifts forward in sequence to the previous header part. As a result of shifting in this manner, the header analysis section needs only to analyze only the information at the beginning of the packet data. Therefore, common design of the IP function sections becomes possible for portions other than the components of the rotation processing section 603 and the resolution conversion processing section 903, which perform image processing on the tiled image data.

Figure 15:
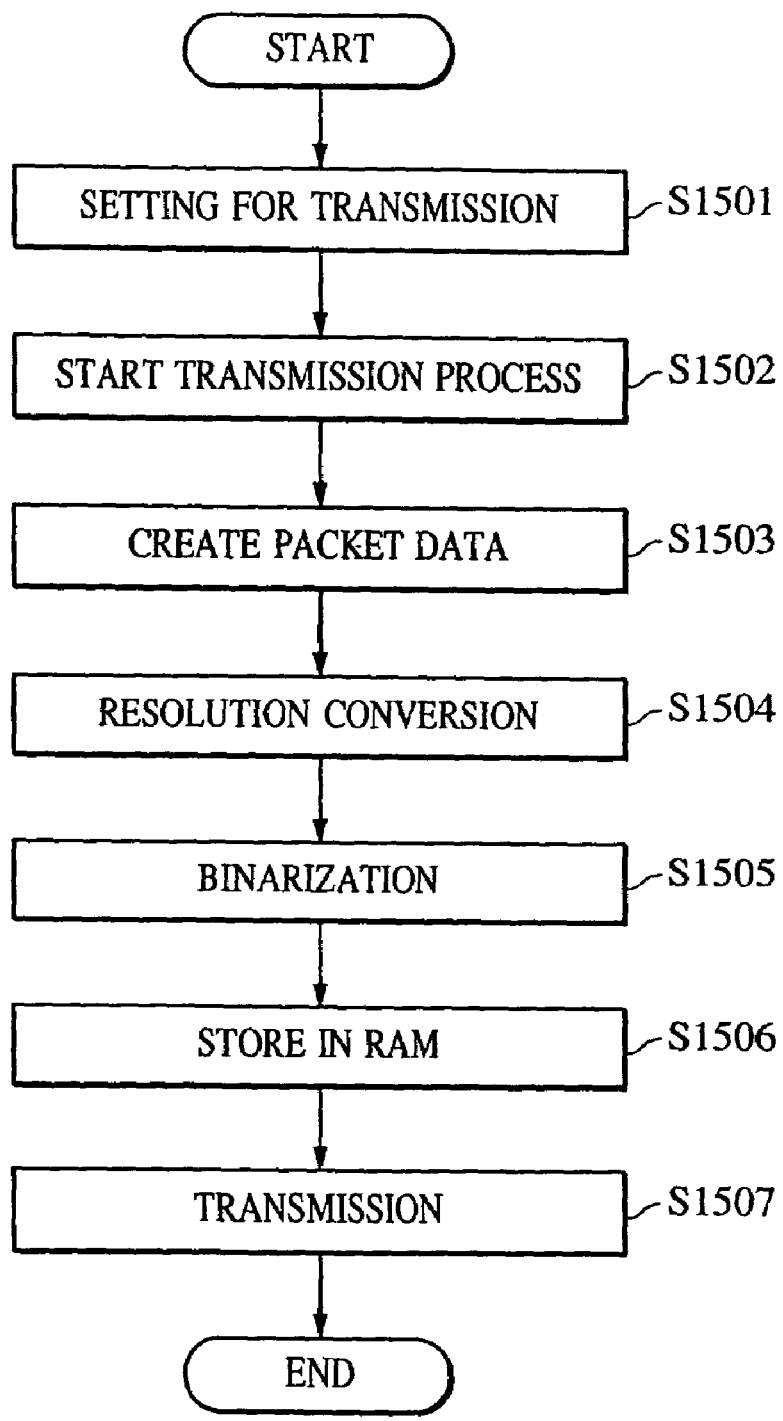
FIG. 15 is a first illustration of packet data when processing is performed in accordance with the flowchart shown in FIG. 13.

Next, a description is given of the operation of an MFP in a case where a user issues an operation command to use one device function possessed by the MFP, and image processing related to the device function is performed on the image data according to the operation command. Here, a description is given by taking, as an example, a case in which the document image stored in the RAM 103 is transmitted by fax with reference to the flowchart shown in FIG. 15.

Initially, the user performs a setting for fax transmission in the operation section 105 of the MFP (S1501). In a touch panel (not shown) provided in the operation section, identification information of the document stored in the RAM 103 is displayed. It is possible for the user to select the document to be transmitted from the displayed identification information. Also, it is assumed that the document image is prestored in the RAM 103 in a tiled state.

After the document to be transmitted is selected, the "resolution" and the "type of document" when the document is to be transmitted are selected. The settings of the fax function in this embodiment are shown in FIG. 16. For the settings of "resolution", there are three selection modes of "standard", "fine", and "superfine", and their specific resolutions are 100×100 dpi, 100×200 dpi, and 100×400 dpi, respectively. Also, for the settings of the "type of document", there are "character" and a "photograph". For specific processing, simple binarization is performed in the case of a "character", and an error diffusion process is performed in the case of a "photograph". The table shown in FIG. 16 is prestored in the ROM 102.

Here, "fine" is selected for "resolution", and "character" is selected for the "type of document". After all the settings related to the fax transmission are completed, the user issues a transmission command by depressing a start button (not shown) (S1502).

When the CPU 101 receives the settings in the operation section 105 and the transmission command, the CPU 101 reads corresponding setting values from the table shown in FIG. 16, which is prestored in the ROM 102. Then, the CPU 101 creates a header in which the identification information and the image processing mode of the IP function section used for image processing are described in sequence. Furthermore, the CPU 101 reads the tiled image data corresponding to the document to be transmitted from the RAM 103 and adds the created header to the read tiled image data, thereby creating packet data (S1503).

The form of the created packet data is shown in FIG. 17. As shown in FIG. 16, the "fine mode" regarding the "resolution" corresponds to the process of mode 1 in the resolution conversion function section 203, and the "character" regarding the "type of resolution" corresponds to the process of mode 0 in the binarization function section 204. Furthermore, in a case where fax transmission is performed, after image processing is performed, since the data is stored once in the RAM 103, the processing sequence is resolution conversion function section 203→binarization function section 204→RAM 103. The created packet data is input to the crossbar switch 201, and the crossbar switch 201 transfers the packet data to the resolution conversion function section 203 which is a first IP function section.

The resolution conversion function section 203 inputs the transferred packet data, and the input I/F section 901 divides the packet data to a header and tiled image data, and transfers the header to the header analysis section 902 and transfers the tiled image data to the resolution conversion processing section 903. The header analysis section 902 analyzes the first header part of FIG. 17 at the beginning of the header, and issues instructions to the resolution conversion processing section 903 so that the process of mode 1 is performed. The resolution conversion processing section 903 performs resolution conversion in mode 1 corresponding to the "fine mode" (100×200 dpi) on the input tiled image data (S1504). Based on the converted tiled image data, together with the header rewritten by the data selection section 905, packet data shown in FIG. 18 is created, and the packet data is transmitted to the binarization function section 204, which is the next IP function section, by the output I/F section 906.

Figure 18:
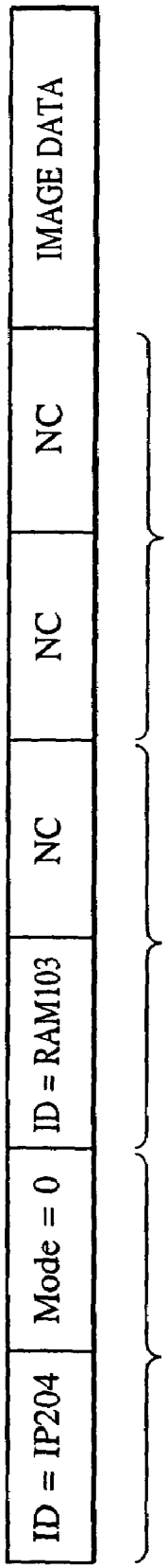
Figure 19:
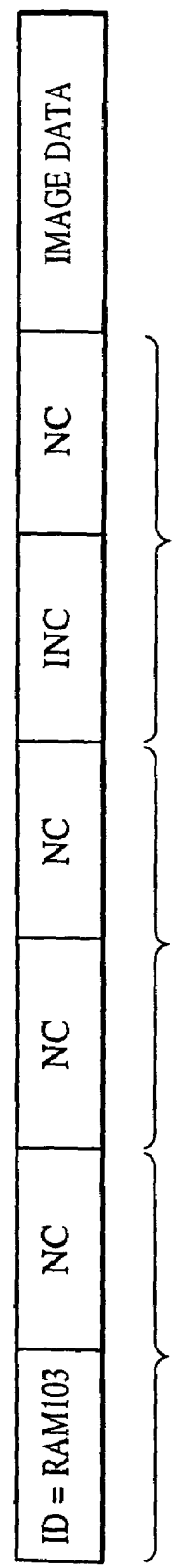

Similarly, in the rotation function section 205, based on the information of the first header part at the beginning of the header shown in FIG. 18, a process of mode 0 corresponding to "character" (simple binarization) is performed, and new packet data shown in FIG. 19 is created (S1505).

The created packet data is output from the image processing section 104 via the crossbar switch 201 and is temporarily stored as tiled image data in the RAM 103 (S1506).

The tiled image data which is stored once in the RAM 103 is transferred in a fax transmittable document form to the fax section 110. The fax section 110 performs encoding, such as MMR (Modified Modified Read), on the transferred image data, and after the image data is modulated by a modem, it is transmitted to the other party via a communication line, and the series of processing is terminated (S1507).

Although in this embodiment, only the operations in fax transmission were described, even when, for example, operations, such as electronic sort, PDL (Page Description Language) print, and color copying, are performed, image processing by packet data can be described by the same construction and procedure.

Next, as an example of a concurrent multifunction operation in this embodiment, a description is given of a case in which fax transmission, and a copying operation using electronic sort are performed in parallel.

Here, the electronic sort function is described briefly. In a case where a plurality of copies of the document is made, the printer section of the MFP prevents mixing of copies by causing each copy to be assigned to a plurality of bins provided therein and by performing paper ejection, which is performed conventionally. In contrast, recently, a digital copier has been proposed in which sheets of paper are output by changing their direction of paper ejection for each copy with respect to one bin. This digital copier changes the direction of the image by performing a rotation process on the input image data within the device, and the printer section forms an image on the basis of the image data in which the direction of the image is changed, thereby changing the ejection direction of the output paper. In the MFP of this embodiment, the image processing section 104 is provided with the rotation function section 205. Therefore, in the MFP of the embodiment, while the CPU 101 controls the operation of the scanner section 106 and the printer section 109, image processing using the rotation function section 205 is performed, making it possible to perform this electronic sort function.

The flow of the image data in a case where electronic sort is performed by the MFP of this embodiment is described below. First, the reading of the document by the scanner section 106 is performed similarly to the operation from steps S402 to S404 in the flowchart in FIG. 4, and the tiled image data is stored once in the RAM 103. Here, if the number of documents is large and all the tiled image data cannot be stored in the RAM 103, the data may be stored in a HDD (not shown) as required.

The CPU 101 adds a header, in which processing information of 90° rotation and processing sequence information so as for the data to be returned to the RAM 103 again are described, to the tiled image data which is stored once in the RAM 103 in order to create packet data. The created packet data is then transferred to the image processing section 104, and the packet data which is rotated by 90° by the rotation function section 205 is stored again as the tiled image data in the RAM 103.

The CPU 101 transfers the tiled image data stored in the RAM 103 to the printer I/F section 108, and the printer I/F section 108 reconstructs the tiled image data into image data in page units. The created image data in page units is sent to the printer section 109, and the printer section 109 forms an image on output paper on the basis of the transferred image data, and the output paper on which an image is formed is output to a paper-ejection tray. The above process is repeated until a specified number of copies of image output is completed. At this time, by changing the angle of rotation in units of copies, electronic sort is realized.

In the foregoing, the operation in a case where electronic sort of the MFP according to this embodiment was described. It is assumed that, while a copying operation using this electronic sort function is being performed, the operator instructs a fax operation shown in FIG. 13. Then, the CPU 101 starts the fax operation according to the instructions, and the MFP enters a state of a concurrent multifunction operation in which a fax operation and a copying operation using the electronic sort function are performed concurrently. At this time, the image processing section 104 is in a state in which the resolution conversion function section 203 and the binarization function section 204 are used for the fax operation, and the rotation function section 205 is used for the copying operation (electronic sort). Therefore, in the image processing section 104, image data to be processed in the fax operation, and image data to be processed in the copying operation coexist.

However, as has thus been described, even when a large number of image processing is performed concurrently, the CPU 101 needs only to perform a process for creating packet data and transferring the packet data to the first IP function section, and does not need to perform status management related to each IP function and timing control related to image data. Therefore, it is possible to perform a concurrent operation without imposing a large load on the CPU 101.

In addition, by performing processing in tile units, there is no need to provide an image processing section for each operation and memory in page units, and efficient image processing can be performed.

In this example, a concurrent multifunction operations of a fax function and an electronic sort function were described. As a concurrent operation, the same description can be made even for a case of a fax operation and a PDL print, and a case of electronic sort and a PDL print.

Furthermore, the concurrent multifunction operation is not limited to two functions, and, for example, a concurrent multifunction operation of three functions, such as a fax operation, electronic sort, and a PDL print, may be performed.

As has thus been described, according to this embodiment, a header in which image processing sequence information, processing content information, etc., are described is added to tiled image data so as to create packet data, and the created packet data is transferred among IP function sections. Furthermore, within each IP function section, packet data is input, and image processing of the tiled image data is performed in accordance with the processing content information described in the header, and packet data to which the header, in which the image processing sequence information and the processing content information are rewritten, is added to the tiled image data after processing and is output.

As a result, advantages can be obtained in that the management of each IP function section in a series of image processing operations performed by the CPU can be facilitated, and the load of the management of the image processing section in the control of the entire system can be reduced.

According to this embodiment, when a copying operation using an electronic sort function and a fax transmission operation are performed in parallel, packet data corresponding to the copying operation is created by using tiled image data for the copying operation, and packet data corresponding to the fax operation is created by using tiled image data for the fax operation, so that the packet data for the copying operation and the packet data for the fax transmission operation coexist in the image processing section. Then, in the image processing section, while processing of the packet data for the copying operation is being performed by an IP function section, in another IP function section, processing of the packet data for the fax operation is performed.

As a result, even in a state in which a concurrent multi-function operation is performed, the CPU needs only to create packet data corresponding to the respective operations, yielding the advantage that image processing can be performed efficiently without imposing a large load on the CPU. Furthermore, since processing in units of tiled image data becomes possible, it is not necessary to allocate a memory and an image processing section in page units, yielding the advantage that efficient image processing can be performed.

In addition, image processing information in the header of the packet data in this embodiment is described in sequence from the beginning of the header in accordance with the sequence in which image processing is performed. Then, in the IP function section, after image processing is performed, a first header part is deleted, and the header part is shifted forward in sequence to the previous header part. As a result, the header analysis section in each IP section needs only to analyze only the information at the beginning of the packet data, yielding the advantage that common design of the construction in each IP function section is made possible.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An image processing apparatus comprising:
   a first image processing unit adapted to perform a first image process on image data;
   a second image processing unit adapted to perform a second image process on the image data;
   a packet-data creation unit adapted to create a first packet data by adding to the image data a first identification information for identifying the first image processing unit; and
   a transfer unit adapted to transfer the first packet data created by the packet-data creation unit to the first image processing unit based on the first identification information,
   wherein the first image processing unit is adapted to create a second packet data by adding to the image data, to which the first image process is performed, a second identification information for identifying the second image processing unit, and
   wherein the transfer unit transfers the second packet data created by the first image processing unit to the second image processing unit based on the second identification information.

2. An image processing apparatus according to claim 1,
   wherein the packet-data creation unit creates the first packet data by adding to the image data the first identification information and the second identification information, and
   wherein the first image processing unit creates the second packet data by adding to the image data, to which the first image process is performed, the second identification information which is added to the first packet data.

3. An image processing apparatus according to claim 2, wherein the first identification information and the second identification information are described in sequence from a beginning of the first Packet data so that the first image process is performed earlier than the second image process.

4. An image processing apparatus according to claim 1, further comprising:
   an input unit adapted to input page image data; and
   a generation unit adapted to generate a plurality of image data by dividing the page image data into a predetermined size.

5. An image processing apparatus according to claim 4, further comprising:
   a storage unit adapted to store the plurality of the image data generated by the generation unit,
   wherein the transfer unit transfers the image data, to which the first image process and the second image process are performed, to the storage unit.

6. An image processing apparatus according to claim 5, further comprising:
   an image forming unit adapted to form an image on a recording medium based on the page image data,
   wherein the transfer unit transfer the page image data, which includes the plurality of the image data to which at least the first image process and the second image process are performed, from the storage unit to the image forming unit.

7. An image processing apparatus according to claim 1, wherein one or both of the first image process and the second image process is at least a image rotation process.

8. An image processing apparatus according to claim 1, wherein one or both of the first image process and the second image process is at least a image resolution conversion process.

9. An image processing apparatus according to claim 1, wherein the first image process is performed on a first image data and the second image process is performed on a second image data, which is different form the first image data, and wherein the first image process and the second image process may be performed simultaneously.

10. An image processing apparatus according to claim 9, further comprising:
an input unit adapted to input page image data; and
a generation unit adapted to generate the first image data and the second image data by dividing the page image data into a predetermined size.

11. An image processing apparatus according to claim 1, further comprising:
a first input unit adapted to input image data; and
a second input unit adapted to input image data,
wherein the first image process is performed on a first image data inputted by the first input unit and the second image process is performed on a second image data inputted by the second input unit,
wherein the second image data is different from the first image data, and
wherein the first image process and the second image process may be performed simultaneously.

12. An image processing apparatus according to claim 1, wherein the packet-data creation unit creates the first packet data by adding to the image data a plurality of identification information corresponding to a number of image processing units of the image processing apparatus.

13. An image processing method for performing image processing on image data, comprising the steps of:
a first creation step of creating a first packet data by adding to the image data a first identification information for identifying a first image processing unit, which performs a first image process on the image data;
a first transfer step of transferring the first packet data created in the first creation step to the first image processing unit based on the first identification information;
a first image processing step of performing the first image process on the image data included in the first packet data;
a second creation step of creating a second packet data by adding to the image data, to which the first image process is performed, a second identification information for identifying a second image processing unit, which performs a second image process on image data; and
a second transfer step of transferring the second packet data created in the second creation step to the second image processing unit based on the second identification information.

* * * * *

UNITED STATES PATENT AND TRADEMARK OFFICE
CERTIFICATE OF CORRECTION

| | |
|---|---|
| PATENT NO. | : 7,379,201 B2 |
| APPLICATION NO. | : 11/199202 |
| DATED | : May 27, 2008 |
| INVENTOR(S) | : Takehito Utsunomiya |

It is certified that error appears in the above-identified patent and that said Letters Patent is hereby corrected as shown below:

SHEET 11:

Figure 11, "ANNANYSIS" should read --ANALYSIS--.

SHEET 15:

Figure 16, "TOUTCH" should read --TOUCH--.

COLUMN 1:

Line 44, "MFSPs" should read --MFPs--.

COLUMN 4:

Line 54, "ment." should read --ment;--.

COLUMN 6:

Line 16, "transfer" should read --transferring--; and
    Line 37, "perform," should read --performs,--.

COLUMN 11:

Line 46, "and" should read --but also by--; and "have" should read --which have this construction--; and
    Line 65, "only" (first occurrence) should be deleted.

COLUMN 12:

Line 65, "to" should read --into--.

COLUMN 14:

Line 52, "operations" should read --operation--.

UNITED STATES PATENT AND TRADEMARK OFFICE
CERTIFICATE OF CORRECTION

PATENT NO. : 7,379,201 B2
APPLICATION NO. : 11/199202
DATED : May 27, 2008
INVENTOR(S) : Takehito Utsunomiya It is certified that error appears in the above-identified patent and that said Letters Patent is hereby corrected as shown below:

<u>COLUMN 15</u>:

Line 44, "only" should be deleted.

<u>COLUMN 16</u>:

Line 31, "Packet" should read --packet--;
Line 50, "transfer" (second occurrence) should read --transfers--;
Line 57, "a" should read --an--;
Line 60, "a" should read --an--; and
Line 66, "form" should read --from--.

Signed and Sealed this

Eleventh Day of November, 2008

JON W. DUDAS
*Director of the United States Patent and Trademark Office*